United States Patent [19]

Grimes

[11] Patent Number: 5,025,568

[45] Date of Patent: Jun. 25, 1991

[54] PHOTOGRAPHIC ENLARGER ALIGNMENT TOOL AND METHOD FOR ALIGNING A PHOTOGRAPHIC ENLARGER

[75] Inventor: Steven K. Grimes, Wrentham, Mass.

[73] Assignee: E. Philip Levine, Inc., Boston, Mass.

[21] Appl. No.: 380,386

[22] Filed: Jul. 17, 1989

[51] Int. Cl.[5] ............................ G01C 9/28; G01C 9/36
[52] U.S. Cl. ........................................ 33/371; 33/384; 33/390
[58] Field of Search ................. 33/371, 374, 375, 377, 33/384, 390

[56] References Cited

U.S. PATENT DOCUMENTS

| | | | |
|---|---|---|---|
| 596,279 | 12/1897 | Potter | 33/375 |
| 1,278,148 | 9/1918 | Heusser | 33/375 |
| 2,206,003 | 6/1940 | Donnell | 33/390 |
| 2,521,525 | 9/1950 | Krausser | 33/375 |
| 2,689,412 | 9/1954 | Young | 33/371 |
| 2,761,217 | 9/1956 | King | 33/375 |
| 2,788,578 | 4/1957 | Digiacinto | 33/375 |
| 3,030,710 | 4/1962 | Fell | 33/390 |
| 3,101,554 | 8/1963 | Gottula | 33/377 |
| 3,950,860 | 4/1976 | Holcombe | 33/371 |
| 4,848,003 | 7/1989 | Westphal et al. | 33/384 |

FOREIGN PATENT DOCUMENTS

| | | | |
|---|---|---|---|
| 2915664 | 9/1980 | Fed. Rep. of Germany | 33/390 |
| 2915665 | 9/1980 | Fed. Rep. of Germany | 33/390 |
| 470993 | 10/1914 | France | 33/390 |

Primary Examiner—Thomas B. Will
Attorney, Agent, or Firm—Allegretti & Witcoff, Ltd.

[57] ABSTRACT

An improved photographic enlarger alignment tool is disclosed comprising a base plate and a circular level adjustably attached to the base plate by three or more screws adapted to permit calibration of the device in all axes of a plane and alignment of a second plane in all axes simultaneously. A method for using the tool to align the planes of a photographic enlarger is also disclosed.

17 Claims, 1 Drawing Sheet

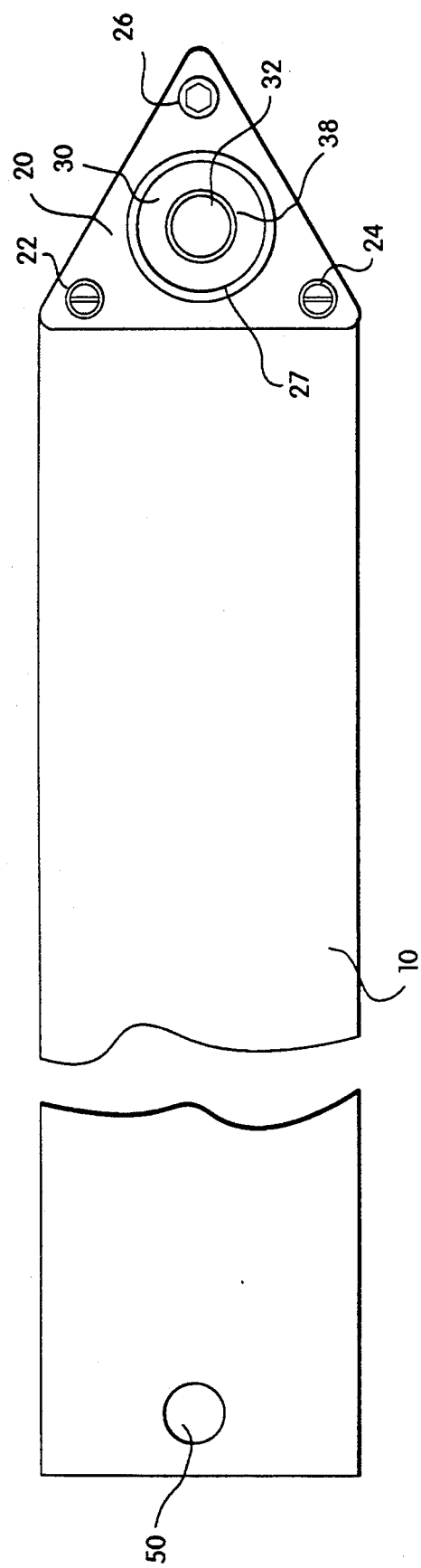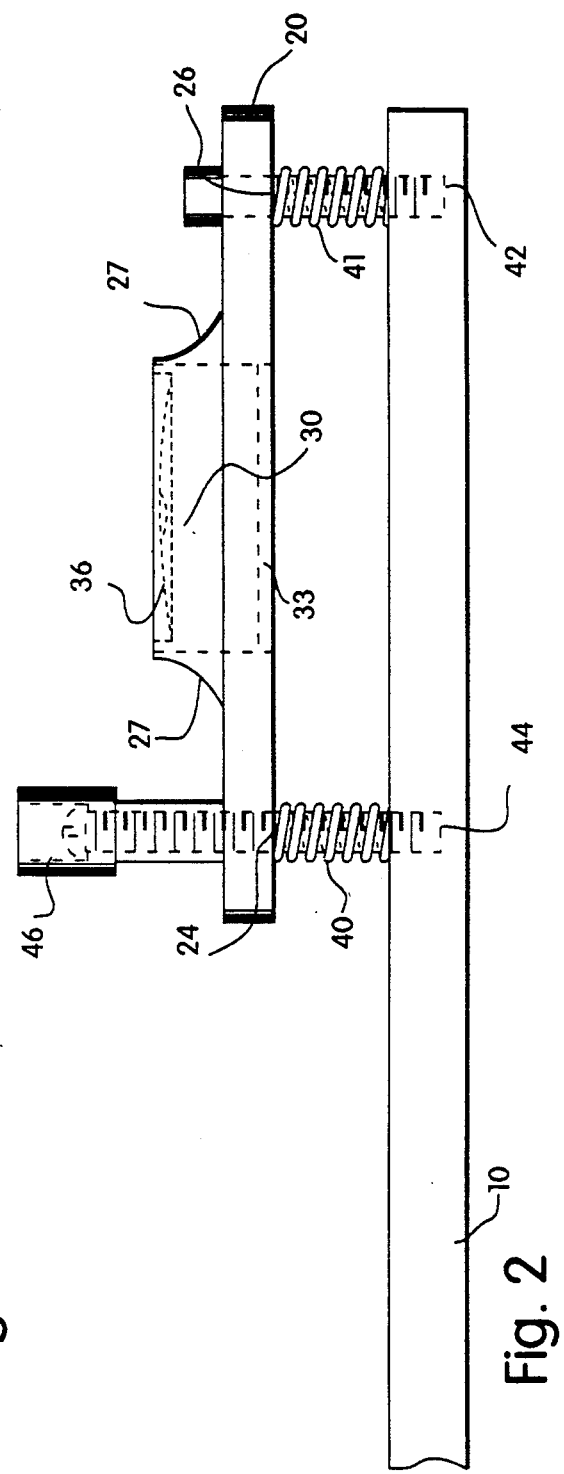

PHOTOGRAPHIC ENLARGER ALIGNMENT TOOL AND METHOD FOR ALIGNING A PHOTOGRAPHIC ENLARGER

BACKGROUND OF THE INVENTION

This invention relates to an improved method for aligning photographic enlarging equipment and a new tool useful therefor. More particularly, this invention relates to the construction and use of an improved leveling device for aligning the negative carrier to the baseboard of a photographic enlarger.

Typical photographic enlargers consist of a projection light source, a negative carrier, a focussing mechanism and a baseboard. In use, the negative to be enlarged is placed in the negative carrier and light is projected through the negative and the focussing mechanism onto photographic paper located on the baseboard.

Typical enlargers permit adjustment of the plane of the negative carrier to enhance the resultant photographic image; for example, to alter the perspective of an image contained on the negative. However, precise reproduction of the negative image requires that the negative carrier be aligned in a plane parallel to that of the baseboard.

Previous enlarger alignment tools have utilized a simple linear spirit level mounted in adjustable spring-loaded cooperation with a flat base plate. The device was calibrated by placing it on the baseboard of the enlarger and an adjusting screw was used to align the bubble in the level element between two marks. The device was next moved to the negative carrier to be aligned in the same linear orientation in which it has been calibrated. The negative carrier was then adjusted until the bubble in the spirit level element was again aligned between the two marks, indicating that the planes were aligned in one axis. The process was then repeated for the axis perpendicular to that in which the planes had just been aligned.

One disadvantage of the prior alignment tool was that it required several successive alignment steps. Adjusting the planes in the second axis often disrupted the results of the first alignment, creating difficulties and delay in precise alignment of the negative carrier and the baseboard.

The tool of the present invention eliminates this disadvantage by reducing the alignment process to a single simple operation.

SUMMARY OF THE INVENTION

A principal object of the present invention is to provide an improved photographic enlarger alignment tool to permit easier and more precise alignment of parallel planes within a photographic enlarger.

A further object of the invention is to reduce the number of steps, and hence the time, required to align parallel planes in a photographic enlarger by facilitating alignment of both axes of the plane in a single step, rather than merely one axis at a time.

A still further object of the present invention is to provide a photographic enlarger alignment tool of proper balance and sufficiently light weight to reduce the likelihood that the negative carrier of the enlarger will be thrown out of alignment by the weight of the tool itself.

Another object of the present invention is to provide a tool and method to achieve the foregoing objects in a form exhibiting ease of use, economy of manufacture and which is pleasing to the eye.

These and other important objects are achieved by the invention, which is, in a principal aspect, an improved photographic enlarger alignment tool. The device includes, in combination, a base plate, a bubble level, such as a circular level, within a suitable housing and three or more screws joining the bubble level to the base plate. At least two of the screws are adjusting screws, enabling the level to be adjusted in two axes. The device is first calibrated by placing it on the baseboard of the photographic enlarger. The adjusting screws are then manipulated until the spirit bubble is aligned within a small centering circle marked on the level. The device is then placed on or within the negative carrier, which is adjusted in the same two axes until the spirit bubble is again aligned within the samll circle on the level.

BRIEF DESCRIPTION OF THE DRAWINGS

FIG. 1 is a top view of the improved photographic enlarger alignment tool of the present invention.

FIG. 2 is an expanded side view of a portion of the improved photographic enlarger alignment tool, showing the hidden structure of the knob and circular level.

DETAILED DESCRIPTION OF THE DRAWING

Referring to the drawing, FIGS. 1 and 2 illustrate the improved photographic enlarger alignment tool of the present invention. In a preferred embodiment, the tool comprises an essentially flat base plate 10 formed from aluminum (most preferably), steel or other suitable material, an approximately triangular level housing 20, also formed of aluminum, steel, plastic or other suitable material, two spring-loaded adjusting screws 22, 24, and a third, nonadjusting anchor screw 26, movably joining the level housing 20 to the base plate, adjacent thereto, and a circular level 30, situated within the level housing 20. The circular level 30, available commercially (e.g. Geier & Bluhm, Inc., 594 River Street, Troy, N. Y. 12180, Part No. 1-9000), includes a vapor bubble 32 sealed within a suitable liquid and visible through a slightly convex view window 36 having an appropriately marked centering circle 38 approximately the same size as, or slightly larger than, the vapor bubble 32.

The base plate 10 is proportioned to be large enough to provide a stable base for the level housing 20 without being too bulky for easy placement and manipulation on a photographic enlarger baseboard or negative carrier. Preferably, the base plate 10 is elongated and measures between about six inches and about twelve inches in length and between about one inch and six inches in width.

The base plate 10 is provided with threaded screw holes, such as 42, 44, located to receive each of the screws 22, 24, 26. To prevent the adjusting screws 22, 24 from protruding below the base plate 10 and raising it from the plane to be aligned, threaded screw holes 42, 44 preferably do not extend through the entire thickness of the base plate 10. The base plate 10 may also be provided with a hanging hole 50, extending through the base plate 10, adapted for convenient hanging of the alignment tool when not in use. Other holes or cut-outs (not shown) may be incorporated in the base plate to reduce its weight so as to minimize alignment error resulting from the weight of the alignment tool itself.

Level housing 20 is preferably essentially triangular in shape, to visually guide the user to the operative adjusting screws, and essentially flat. Most preferably, the length of each side of the level housing is approximately equal to the width of the base plate. A hole, slightly larger in diameter than the diameter of the screws 22, 24, 26, is drilled or otherwise formed near each corner of the bubble level through which the screws 22, 24, 26 extend. A level element sidewall 27 is attached to, or formed within or upon, the level housing 20 to provide a chamber for the circular level 30. The level element sidewall preferably extends above the height of the view window to protect the view window 36 from scratches or other damage. Circular level 30 is mounted upon or within the level housing 20, preferably near its center, and within the level element sidewall 27. Circular level 30 may be secured within the level element sidewall by a layer of Plaster of Paris 33, epoxy, or other suitable material.

Springs, such as 40, 41 are located between the level housing 20, adjacent the holes therein, and the base plate 10, adjacent the threaded screw holes, such as 42, 44. Each adjusting screw 22, 24 extends through the level housing and a spring 40 and is movably secured within a threaded screw hole 44. The anchor screw 26 also extends through the level housing and a spring 41, and is movably or permanently secured within a threaded screw hole such 42. The springs 40, 41, are adapted to provide an upward tension against the level housing 20. Thus, the adjusting screws 22, 24, 26 are spring-loaded. Knobs, such as 46, adapted to facilitate adjustment of the screws by hand without the need for a screwdriver or other tool, may be fitted to one or more of the adjusting screws.

The corners of the level housing 20 and the base plate 10 are preferably rounded. Both the base plate 10 and the level housing are preferably finished in a dark color to prevent the reflection of light. The knobs, such as 46, may be finished in a contrasting color to improve their visibility.

The tool thus described is useful in a method of aligning the baseboard and negative carrier of a photographic enlarger in parallel planes. The tool is calibrated by placing it on the baseboard of the photographic enlarger and adjusting the level element to provide a level reading. Next, the tool is moved to the negative carrier and this second plane is adjusted until a similar level reading is obtained on the alignment tool.

Thus, a novel and improved photographic enlarger alignment tool, and a method of using the tool to align the baseboard and negative carrier of a photographic enlarger, have been disclosed. While a preferred embodiment has been described in detail, it will be apparent to those skilled in the art that changes can be made without departing from the scope of the invention. Therefore, the following claims conclude this specification.

What is claimed is:

1. A tool adapted for use in aligning a photographic enlarger having a baseboard and a negative carrier comprising:
    an essentially flat, elongated base plate formed from aluminum, steel or other suitable material said base plate being sufficiently lightweight and properly balanced to minimize alignment error between the baseboard and the negative carrier;
    an approximately triangular level housing, also formed of aluminum, steel or other suitable material said level housing being sufficiently lightweight and properly balanced to minimize alignment error between the baseboard and the negative carrier;
    two spring-loaded adjusting screws and a spring-loaded anchor screw movably joining the level housing to the base plate adjacent thereto at a point where the level housing is accessible to manipulation when the tool is in use and whereby the baseboard and the negative carrier of the photographic enlarger are able to be aligned in two axes simultaneously; and,
    a circular level, situated within the level housing, including a vapor bubble sealed within a suitable liquid and visible through a slightly convex view window having an appropriately marked centering circle approximately the same size as, or slightly larger than, the vapor bubble.

2. The photographic enlarger alignment tool of claim 1 wherein the base plate measures between about six inches and about twelve inches in length and between about one inch and six inches in width.

3. The photographic enlarger alignment tool of claim 1 wherein the level housing is formed of plastic.

4. The photographic enlarger alignment tool of claim 1 wherein the length of each side of the level housing is approximately equal to the width of the base plate.

5. The photographic enlarger alignment tool of claim 1 wherein the adjusting screws are fitted with knobs adapted to permit adjustment of the screws by hand.

6. The photographic enlarger alignment tool of claim 5 wherein the knobs are of a different color from the level housing.

7. The photographic enlarger alignment tool of claim 1 wherein the base plate includes a hole adapted for hanging the tool when not in use.

8. A tool adapted for use in aligning a photographic enlarger having a baseboard and a negative carrier comprising an essentially flat base plate said base plate being sufficiently lightweight and properly balanced to minimize alignment error between the baseboard and the negative carrier and a level element within a suitable housing said level housing being sufficiently lightweight and properly balanced to minimize alignment error between the baseboard and the negative carrier, said housing being movably mounted above the base plate at a point where the level housing is accessible to manipulation when the tool is in use and whereby the baseboard and the negative carrier of the photographic enlarger are able to be aligned in two axes simultaneously and such that the level is adjustable in a plurality of axes.

9. The photographic enlarger alignment tool of claim 8 wherein the base plate is formed of aluminum, steel or plastic.

10. The photographic enlarger alignment tool of claim 8 wherein the housing is formed of aluminum, steel or plastic.

11. The photographic enlarger alignment tool of claim 8 wherein the level element is a circular level.

12. The photographic enlarger alignment tool of claim 8 wherein the base plate is of a dark color.

13. The photographic enlarger alignment tool of claim 8 wherein the level housing is joined to the base plate by two or more adjusting screws.

14. The photographic enlarger alignment tool of claim 13 wherein the adjusting screws are spring-loaded.

15. The photographic enlarger alignment tool of claim 13 wherein the adjusting screws are disposed adjacent the corners of the level housing.

16. A method of aligning the baseboard and negative carrier of a photographic enlarger in parallel planes comprising:

calibrating a tool adapted for use in aligning the photographic enlarger comprising an essentially flat, elongated base plate formed from aluminum, steel or other suitable material;

an approximately triangular level housing, also formed of aluminum, steel or other suitable material;

two spring-loaded adjusting screws and a spring loaded anchor screw movably joining the level housing to the base plate adjacent thereto; and a circular level, situated within the level housing, including a vapor bubble sealed within a suitable liquid and visible through a slightly convex view window having an appropriately marked centering circle approximately the same size as, or slightly larger than, the vapor bubble, by placing it on the base board of the photographic enlarger and adjusting the level element to provide a level reading; and moving the alignment tool to the negative carrier and adjusting this second plane until a similar level reading is obtained on the alignment tool.

17. A method of aligning the baseboard and negative carrier of a photographic enlarger in parallel planes comprising:

calibrating a tool adapted for use in aligning the photographic enlarger comprising an essentially flat base plate and a level element within a suitable housing, said housing being movably mounted above the base plate such that the level is adjustable in a plurality of axes by placing it on the baseboard of the photographic enlarger and adjusting the level element to provide a level reading; and moving the alignment tool to the negative carrier and adjusting this second plane until a similar level reading is obtained on the alignment tool.

* * * * *